Mar. 27, 1923.
M. L. MARTUS ET AL
1,450,043
PRIMARY BATTERY
Filed Oct. 24, 1921
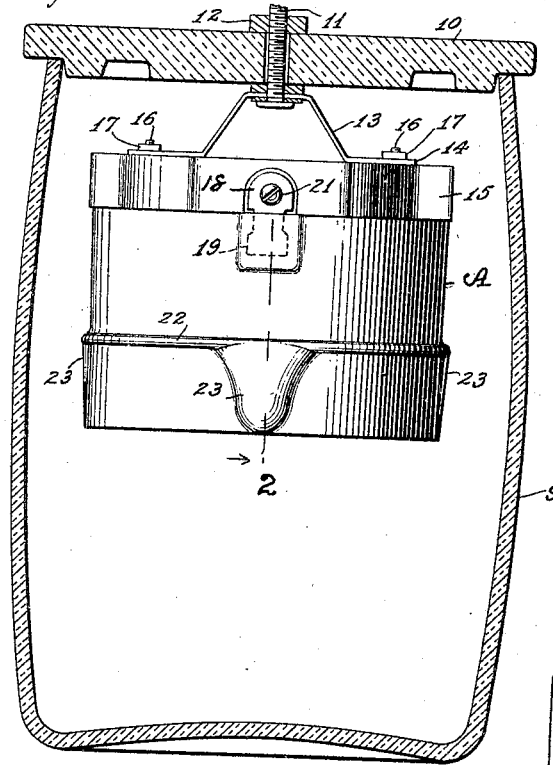
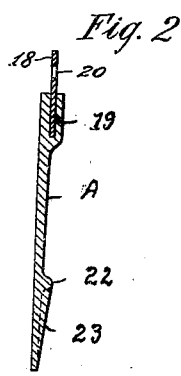
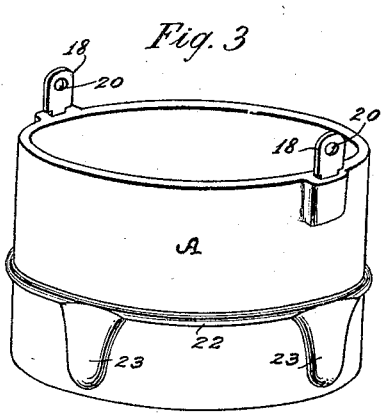
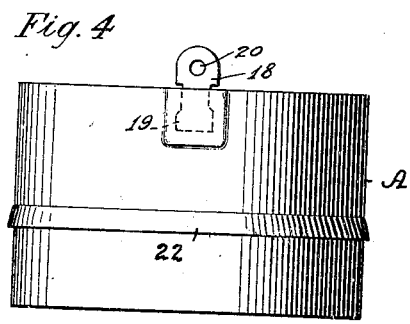
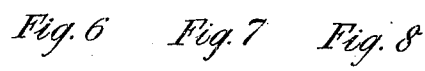
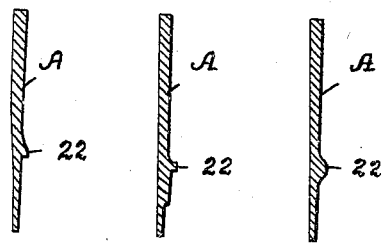
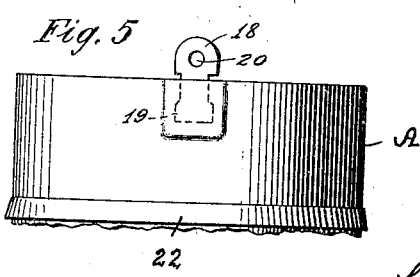
INVENTORS
Martin L. Martus, James G. Ross and
Edmund H. Becker
BY
Chamberlain & Newman ATTORNEYS.

Patented Mar. 27, 1923.

1,450,043

UNITED STATES PATENT OFFICE.

MARTIN L. MARTUS, OF WOODBURY, AND JAMES G. ROSS AND EDMUND H. BECKER, OF WATERBURY, CONNECTICUT, ASSIGNORS TO THE WATERBURY BATTERY CO., OF WATERBURY, CONNECTICUT, A CORPORATION OF CONNECTICUT.

PRIMARY BATTERY.

Application filed October 24, 1921. Serial No. 509,857.

*To all whom it may concern:*

Be it known that we, MARTIN L. MARTUS, of Woodbury, Litchfield County, Connecticut, and JAMES G. ROSS and EDMUND H. BECKER, both of Waterbury, New Haven County, Connecticut, all citizens of the United States, have invented certain new and useful Improvements in Primary Batteries, of which the following is a specification.

This invention relates to primary batteries, and more particularly to positive or zinc electrodes therefor, whether made in plate or cylinder forms.

The invention particularly relates to primary batteries wherein the negative electrode is formed of oxide of copper or similar depolarizers and a positive electrode of zinc, and is adapted to both the cylinder and plate forms of element when used in connection with a suitable active solution also containing a negative electrode.

As is well known to those skilled in the art, the electrolytic action of batteries of this character serves to eat away the positive electrode during the active operation of the battery, and that after a specified number of ampere hour service the positive electrode will disintegrate to such an extent as to impair the efficiency of the battery.

This form of battery is at the present time extensively used for railway signal work, being usually installed adjacent to signal towers positioned along the track, for automatically operating the signals for the trains. These batteries each include a separate glass jar through which the action is always more apparent upon the positive element and since this element is usually arranged, as the outer one of the several elements, it likewise is more noticeable and its condition more readily observed.

The object therefore of our invention is to provide a positive zinc electrode which when coupled with a negative electrode and submerged in an active solution will insure a concentrated electrolytic action in the battery of the lower portion of the zinc so as to destroy the lower edge portion of the zinc and then to gradually eat upward in a manner to readily and at all times indicate, to the user, the condition of the element and battery, and the approaching necessity of renewing the assembled elements. In Fig. 1 of the drawings, we have shown the invention applied to a commercial cylindrical form of zinc electrode whereas the sectional views represent the invention as applied to either a cylindrical or flat plate form of zinc.

It is also an important feature of the invention to design the element so that the metal will flow more freely in the casting operations and thus produce better and more uniform zinc electrodes.

In the accompanying drawings forming a part of this specification similar characters of reference will be found to denote like or corresponding parts throughout the several figures and of which:—

Fig. 1 shows a sectional elevation through a primary battery including its jar and cover, the zinc electrode in said cell being constructed in accordance with the feature of our invention;

Fig. 2 shows a vertical section through the positive electrode taken on line 2—2 on Fig. 1;

Fig. 3 is a detached perspective view of the cylindrical form of zinc electrode shown in Fig. 1;

Fig. 4 is a side elevation of a cylindrical form of zinc electrode showing a slightly different form of the invention;

Fig. 5 is a further side view of the same element as it would appear after being used in a battery to a point of exhaustion;

Figs. 6, 7 and 8 show modified forms of the invention as applied to either cylindrical or flat plate forms of zinc electrode.

Referring in detail to the characters of reference marked upon the drawings, 9 represents a battery jar, 10 a cover therefor having a hole through its center for the attachment of the supporting rod 11 which is provided with a nut 12 for clamping the rod to the cover. The intermediate loop portion 13 of a hanger is secured to the lower head end of the supporting rod and the end portions 14 of the hanger are secured to the porcelain member 15 by means of the two rods 16 and nuts 17. This form of assembled battery element would obviously include one or more negative electrodes, not shown, but suspended from the porcelain member 15 and positioned adjacent to or intermediate of the one or more positive or zinc electrodes A as might be employed.

The zinc electrode as shown in Figs. 1 to 5 inclusive is of a cylindrical type, preferably formed by casting, and includes as its means of attachment to the porcelain 15, sheet metal ears 18, the lower end portions of which are cast in and formed integral with the body of the electrode as indicated at 19. A hole 20 is formed in the upper portion of each of these ears to accommodate the screws 21 for the supporting of the zinc from the porcelain.

The body portion of these electrodes is preferably formed tapering from a thick top edge portion to thinner bottom edge portion, and are of uniform thicknesses across their several horizontal portions. This construction obviously insures the wearing away and disappearance of the lower edge portion of the element before the upper portion, the said disintegration beginning at the extreme lower edge and gradually working upward until the rib or the thickened portion 22 is reached. As the thickness of the zinc is uniform throughout its several horizontal portions and is also of substantially the same degree of density, the bottom edge will wear away across and form a horizontal, though ragged line, as shown in Fig. 5. This condition is insured and made perfectly reliable in a way to more positively indicate the state of exhaustion of the element, by the use of our improved feature, than can be done by any other construction known to us. Our improved construction therefore as will be seen, includes the formation of a horizontal rib, or thickened portion 22, which extends across the electrode at a point intermediate of the top and bottom edge portions and preferably just below the central line around or across the electrode, and in a way to divide the thinner lower portions of the electrode from the upper thicker portions.

The particular shape of this thickened or rib portion is not material thus we have shown several shapes in which it may be used. This lower or thinner portion of the electrode may be strengthened if preferred as shown in Figs. 1, 2 and 3 by the downwardly projected reinforcements 23 which serve to thicken the stock at those points. While these reinforcements are obviously attacked and wear away, yet as proportioned in the particular type of elements shown, they will not entirely disappear before the battery is exhausted as does the skirt portion of the element below the thickened belt portion, thus producing a slightly different shape of exhausted element from that indicated in Fig. 5.

Having thus described our invention, what we claim and desire to secure by Letters Patent, is:—

1. In a primary battery, a cylindrical zinc electrode having an annular integral rib formed upon its outer surface and intermediate its thinner top and bottom edges.

2. In a primary battery, an annular electrode having an integral horizontal rib formed on its side.

3. In a primary battery, the combination of a container, a negative electrode, an active solution and a zinc electrode so constructed and so arranged with reference to the negative element as to insure a concentrated electrolytic action in the battery on the zinc as to first destroy the lower edge portion of the zinc and to gradually eat upward thereafter.

4. A primary battery element, comprising a relatively thin vertically disposed electrode thickened through its intermediate horizontal portion and having relatively thinner top and bottom edge portions.

5. A primary battery element, comprising a relatively thin vertically disposed electrode, thickened through its intermediate horizontal portion and having its area below said thickened portion thinner than that above.

6. A primary battery element, comprising a relatively thin vertically disposed electrode, thickened through its intermediate horizontal portion and having a thin tapered area below said thickened portion.

7. In a primary battery, an electrode having an intermediate horizontally ribbed portion thicker than its lower edge.

8. In a primary battery, an electrode having an intermediate horizontally ribbed portion thicker than its lower edge and having tapered thickened portions extended downward from said rib.

Signed at Waterbury, in the county of New Haven and State of Connecticut, this 17th day of October, A. D. 1921.

MARTIN L. MARTUS.
JAMES G. ROSS.
EDMUND H. BECKER.

Witnesses:
HARRY T. HUBERT,
C. M. NEWMAN.